(12) United States Patent
Nuti et al.

(10) Patent No.: US 11,292,328 B2
(45) Date of Patent: Apr. 5, 2022

(54) SYNCHRONIZED TRANSMISSION

(71) Applicant: Piaggio & C. S.P.A., Pontedera (IT)

(72) Inventors: Luca Nuti, Pontedera (IT); Walter Mariotti, Pontedera (IT)

(73) Assignee: PIAGGIO & C. S.p.A., Pontedera (IT)

( * ) Notice: Subject to any disclaimer, the term of this patent is extended or adjusted under 35 U.S.C. 154(b) by 409 days.

(21) Appl. No.: 16/464,891

(22) PCT Filed: Nov. 30, 2017

(86) PCT No.: PCT/EP2017/081012
§ 371 (c)(1),
(2) Date: May 29, 2019

(87) PCT Pub. No.: WO2018/100078
PCT Pub. Date: Jun. 7, 2018

(65) Prior Publication Data
US 2019/0389295 A1    Dec. 26, 2019

(30) Foreign Application Priority Data
Dec. 1, 2016 (IT) .......................... 102016000122192

(51) Int. Cl.
*B62M 7/06* (2006.01)
*B60K 5/04* (2006.01)
(Continued)

(52) U.S. Cl.
CPC .............. *B60K 5/04* (2013.01); *B60K 17/043* (2013.01); *B62M 7/06* (2013.01); *B62M 9/04* (2013.01);
(Continued)

(58) Field of Classification Search
CPC ..... B62M 7/06; B62M 9/04; F16D 2023/123; F16H 61/28; F16H 63/18; F16H 7/02
See application file for complete search history.

(56) References Cited

U.S. PATENT DOCUMENTS

| 2008/0099268 A1* | 5/2008 | Hiroi | .................... | B60W 10/02 |
| | | | | 180/293 |
| 2014/0090498 A1* | 4/2014 | Kojima | .................. | F16H 63/14 |
| | | | | 74/331 |

(Continued)

FOREIGN PATENT DOCUMENTS

| CN | 201784785 | 4/2011 |
| EP | 2527236 | 11/2012 |

(Continued)

*Primary Examiner* — Edwin A Young
(74) *Attorney, Agent, or Firm* — Stetina Brunda Garred and Brucker

(57) ABSTRACT

A synchronized transmission (1) used in a motorcycle, wherein a crankshaft actuated by the engine and a driven shaft, connected to a rear wheel, are substantially parallel and kinematically connected therebetween, comprising a first axial actuation synchronizer (16) placed at the front of the crankshaft (2) and a second axial actuation synchronizer (17) arranged at the front of a driven shaft kinematically connected to a rear wheel, each synchronizer (16, 17) comprising a respective rotating cam actuator (26, 29) having a cam (29) apt to be rotated by a respective cam spindle (30) by determining a translation thereof which interferes with an actuation end of the respective synchronizer (16, 17).

10 Claims, 4 Drawing Sheets

(51) Int. Cl.
*B60K 17/04* (2006.01)
*B62M 9/04* (2006.01)
*F16H 7/02* (2006.01)
*F16D 23/12* (2006.01)
*F16H 61/28* (2006.01)
*F16H 63/18* (2006.01)

(52) U.S. Cl.
CPC ............ *F16H 7/02* (2013.01); *B60Y 2200/12* (2013.01); *F16D 2023/123* (2013.01); *F16H 61/28* (2013.01); *F16H 63/18* (2013.01)

(56) References Cited

U.S. PATENT DOCUMENTS

| | | | |
|---|---|---|---|
| 2015/0176660 A1* | 6/2015 | Ruebsam | F16D 13/52 |
| | | | 192/48.8 |
| 2016/0290441 A1* | 10/2016 | Tsukada | F16H 63/18 |
| 2018/0094575 A1* | 4/2018 | Okada | F02B 61/02 |

FOREIGN PATENT DOCUMENTS

| | | |
|---|---|---|
| FR | 3008755 | 1/2015 |
| GB | 2526902 | 12/2015 |
| JP | H05157163 A | 6/1993 |
| JP | 2007177908 | 7/2007 |

\* cited by examiner

SYNCHRONIZED TRANSMISSION

CROSS REFERENCE TO RELATED APPLICATION(S)

The present application claims priority to PCT International Application No. PCT/EP2017/081012 filed on Nov. 30, 2017, which application claims priority to Italian Patent Application Nos. 102016000122192 filed Dec. 1, 2016, the entirety of the disclosures of which are expressly incorporated herein by reference.

STATEMENT RE: FEDERALLY SPONSORED RESEARCH/DEVELOPMENT

Not Applicable.

DESCRIPTION

The present invention relates to a synchronized transmission which can be used in a vehicle and in particular a motorcycle, wherein the crankshaft actuated by the engine and the driven shaft, connected to a rear wheel, are substantially parallel therebetween and both parallel to the hub axis of the rear wheel which is kinematically connected to the crankshaft in a synchronous way, for example by means of pulleys assembled on the respective shafts and at least a belt therebetween.

It is to be meant that what discussed hereinafter can be applied even to a synchronous transmission of other type, for example a transmission using pinion—chain—toothed wheel.

Generally, for driving different speeds, two synchronizers can be provided: a first synchronizer placed at the front of the crankshaft and a second synchronizer placed at the front of a driven shaft connected kinematically to said rear wheel.

According to this scheme, the synchronizers have to be actuated based upon a predetermined sequence thereto the different transmission speeds correspond.

However, the synchronizers have to be driven with an absolute respect for said sequence and actuation time requested for each speedchange, in repeatable and continuing way.

The technical problem underlying the present invention is to provide a synchronized transmission allowing to obviate the drawback mentioned with reference to the known art.

Such problem is solved by a synchronized transmission as specified in appended claim 1.

The main advantage of the above defined transmission consists in guaranteeing the implementation of each synchronizer according to a prefixed scheme.

The present invention will be described hereinafter according to a preferred embodiment thereof, provided by way of example and not for limitative purposes with reference to the enclosed drawings wherein.

Figure 5:
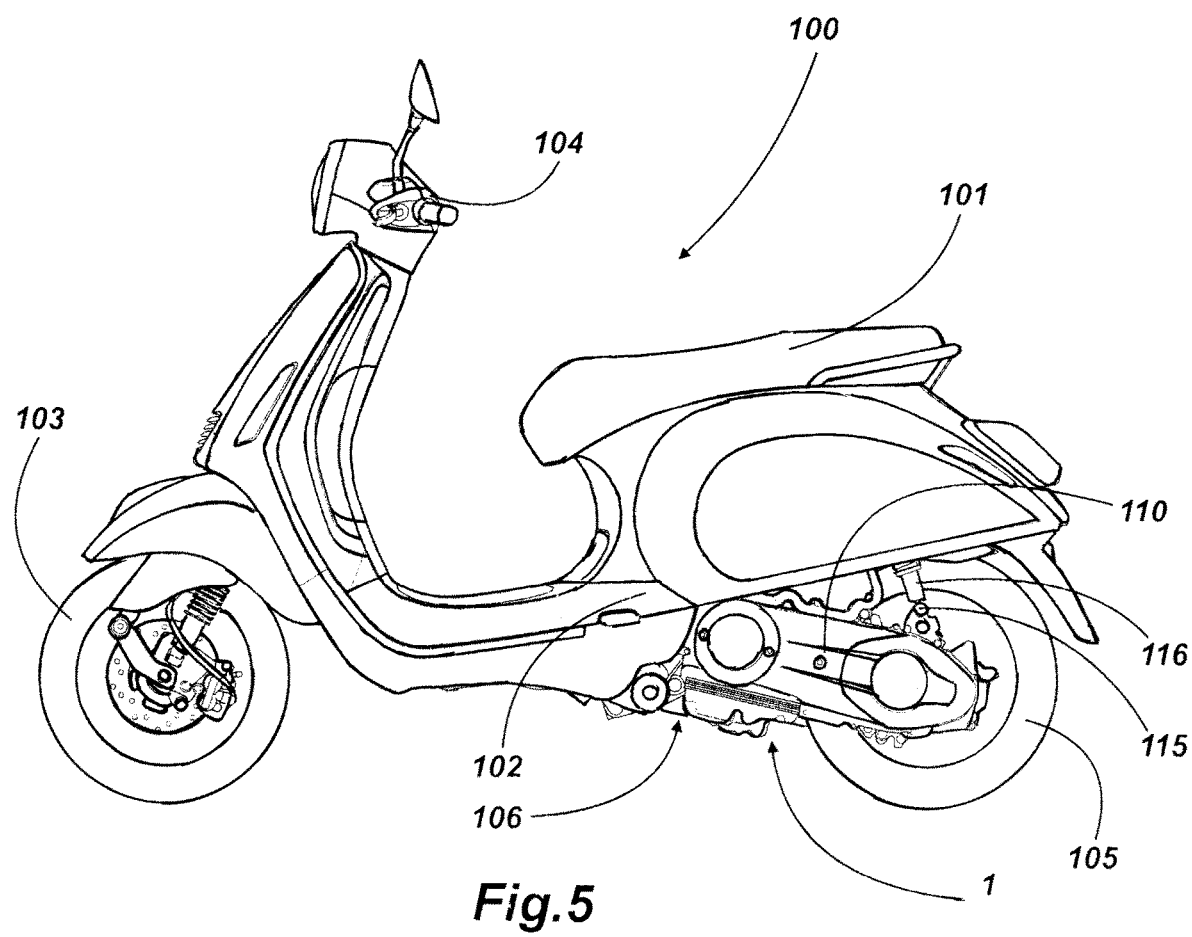
FIG. 5 shows a side raised view of a scooter incorporating the transmission according to the present invention.
Figure 6:
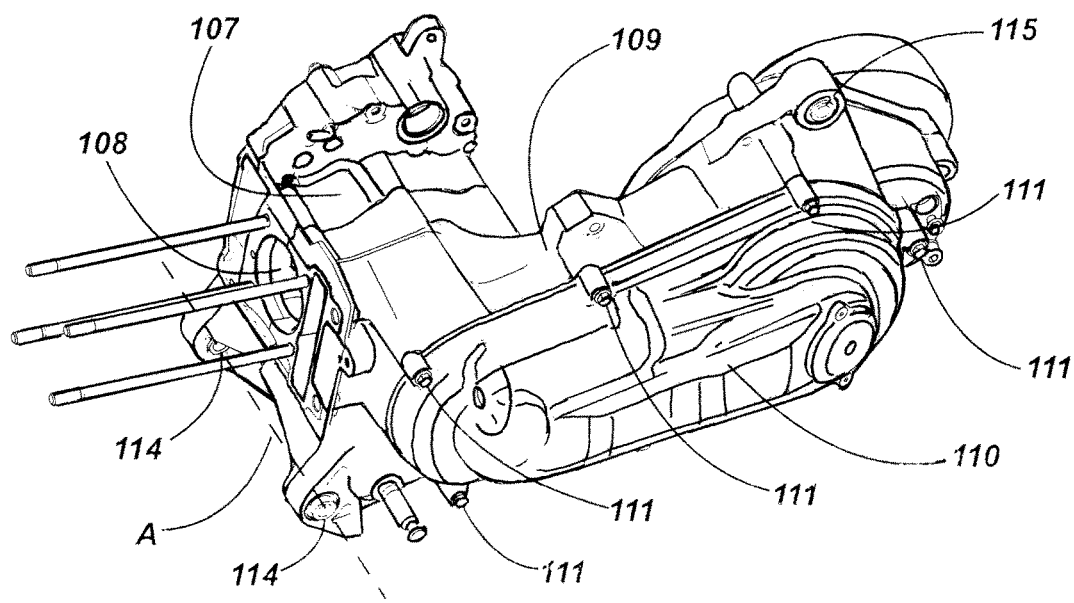
FIG. 6 shows a perspective view of the transmission of FIG. 1, closed in the container thereof, and of the related engine block.

By referring to FIGS. 5 and 6, a motorcycle, and in particular a scooter, is designated as a whole with 100. The invention relates to the field of the saddle vehicles, or vehicles which are driven astride, in general, having two, three or four wheels, with particular reference to the scooters having a propulsion unit arranged in a position below a saddle 101, inside a chassis 102 which herein is represented laterally, extending from a front wheel 103, driven by a handlebar 104 to a driving rear wheel 105.

The propulsion unit 106 (FIG. 6) or, in short, the engine is of the type having one or more cylinders arranged in a tilted position approximatively on the median plane of the vehicle which corresponds to the rotation plane of the two wheels during the rectilinear forward motion.

The engine 106 has an engine block 107 in one single piece which receives, in the present embodiment, a cylinder 108 and a related (not visible) piston.

The piston acting in said cylinder 108 is connected to a crankshaft 2 positioned transversally and perpendicularly to said median plane. On one represented side (FIGS. 5 and 6) of the scooter 100 a transmission device 1 is provided or, more shortly, a transmission of the motion from the crankshaft to the hub of the rear wheel 105.

The transmission 1 has a container 109 which receives inside thereof the transmission elements which will be described in greater detail hereinafter. The container 109 is connected to the engine block 107 by creating a tunnel-like casing including the crankshaft 2 and all transmission elements connected thereto.

Moreover, the container 109 is closed, on the exposed side of the motorcycle 100, by a cover 110 of the transmission 1, which extends substantially from the engine 106 to the hub shaft of the driving wheel 105. The cover 110 is fastened to the container 109 by means of suitable bolts 111. Openings, slots, air intakes could be provided to access and/or cool down the transmission elements through said cover 110.

The cover 110 is rested upon a fixing edge 112 of the container 109, provided with fixing seats 113 for said bolts 111 and with additional front connection seat 114, with a hinge connection of axis A to allow the engine block 107 and the transmission 1 to swing, and rear connection seat 115, connected to a rear suspension 116, to connect the casing 109 and the whole transmission 1 to the frame of the vehicle 100.

Such transmission is of multiple speed type and of synchronous type 1, and it is arranged for connecting the crankshaft 2, which receives the motion from moving one or more pistons, to the hub shaft, by considering that these two shafts are parallel therebetween and placed at a prefixed distance. The hub shaft, at a distal end thereof, is provided with a pinion 5 for connecting to the rear wheel 105.

They are both perpendicular to the median plane of the vehicle, defined by the rotation plane of the front and rear wheels. It is further meant that the use of this type of transmission is not limited to the herein represented two-wheel scooter, but it can be extended to a scooter with a pair of front wheels or to four-wheel scooters.

Figure 1:
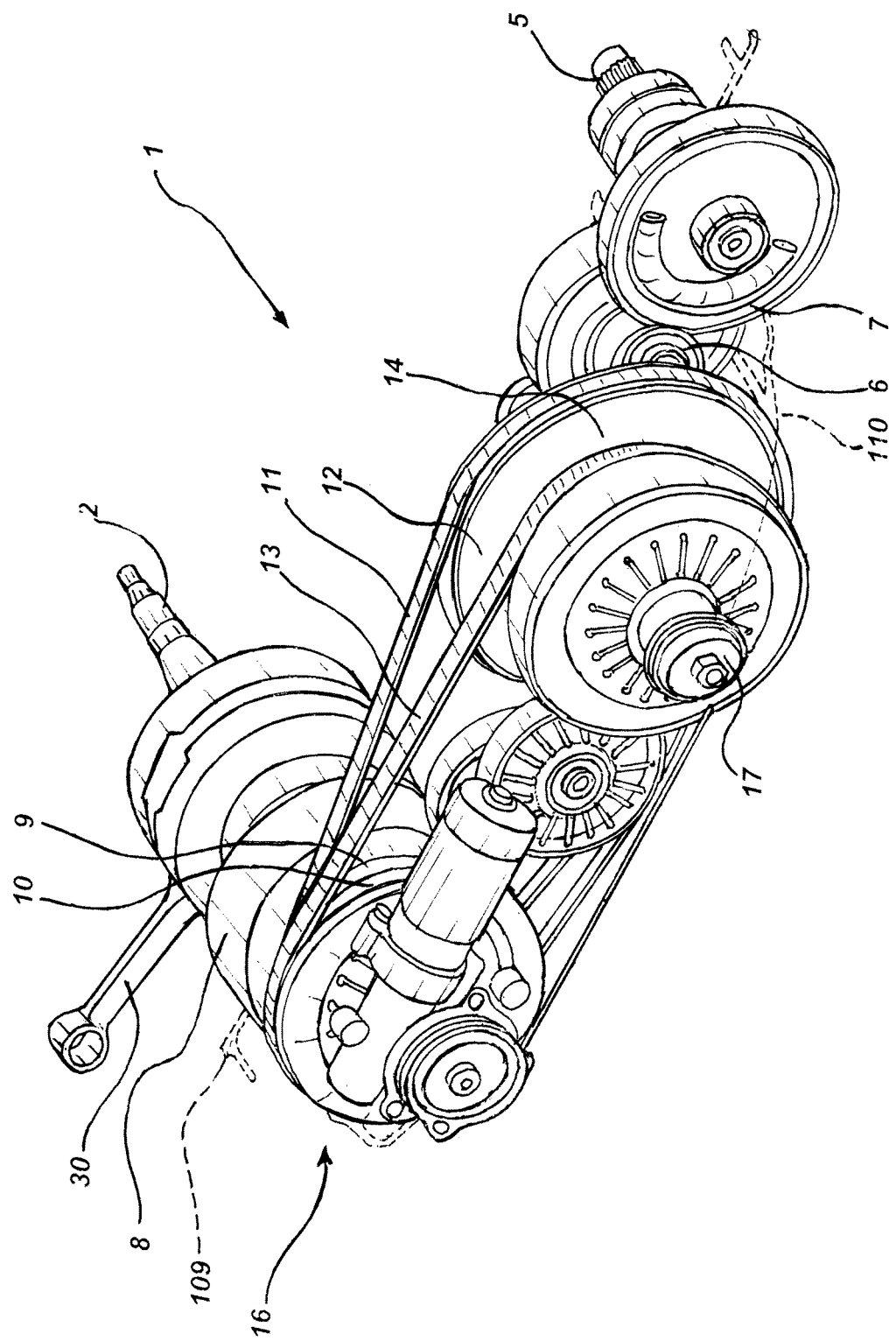
FIG. 1 shows an axonometry view of a synchronized transmission according to the present invention.
Figure 2:
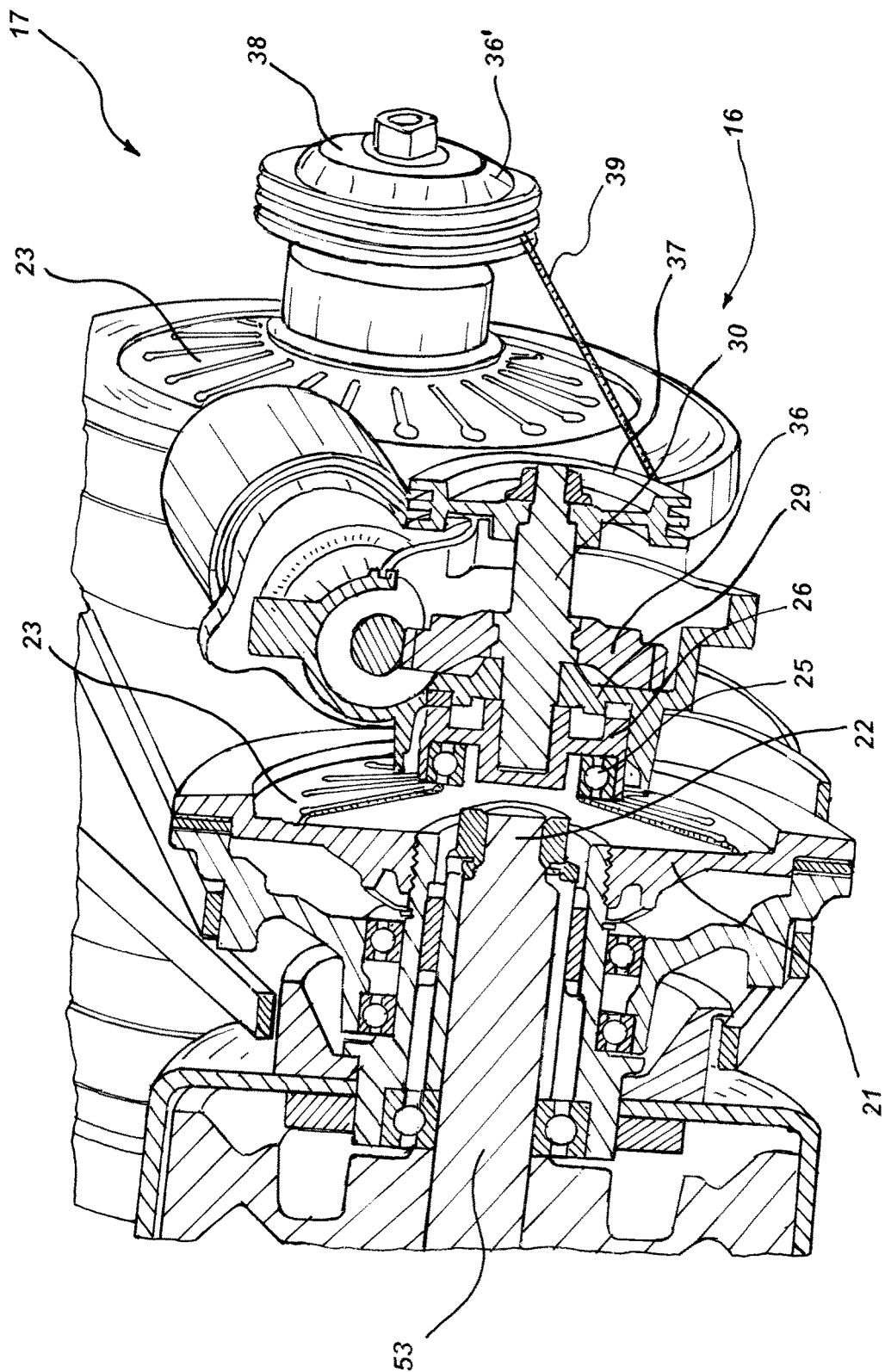
FIG. 2 shows a cutaway view of the synchronized transmission of FIG. 1, corresponding to the crankshaft.
Figure 4:
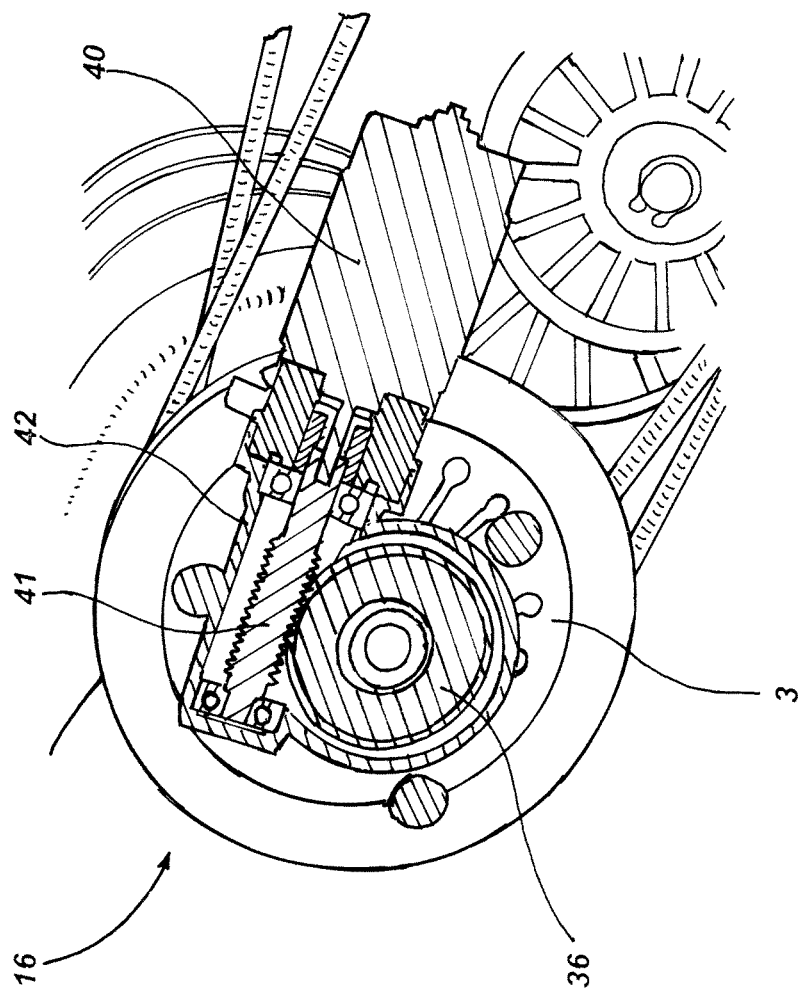
FIG. 4 shows a longitudinal section of the detail of the synchronized transmission of FIG. 3.
Figure 3:
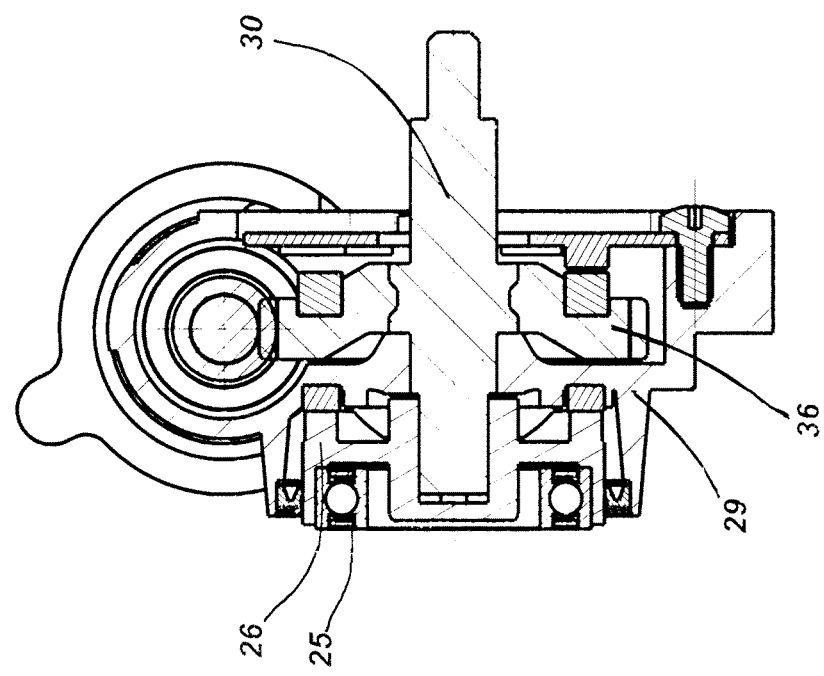
FIG. 3 shows a cross-section of a detail of the synchronized transmission of FIG. 1.

By referring instead to FIGS. 1 and 2, a multiple gearbox without the casing 109 and the cover 110, in particular a transmission with four-speed gearbox, is designated as a whole with 1. It is of the type suitable to be assembled on a motorcycle as transmission element which actuates a driving wheel of the motorcycle 100, in particular a scooter, that is the rear wheel thereof 105.

On this regard, it comprises a crankshaft 2, which is made to rotate by the engine, thereof the piston rod 30 is represented, and a first driven shaft, that is the primary shaft, and a secondary shaft, which can be connected directly to the wheel or which transmits the rotation, as in the present embodiment, to a hub shaft 5 which is connected to the driving wheel of the vehicle.

It is to be noted that the arrangement of the shafts is so that the crankshaft 2 assumes a position which is substantially parallel to the rotation axis of the driving wheel, that is to the hub shaft 5. Therefore, this transmission element has the purpose of transferring the motion from an engine, having a crankshaft transversal to the motorcycle, to a wheel having an axis transversal to the vehicle, too.

The passage from secondary shaft to hub shaft 5 takes place through a pair of gearwheels 6, 7 which have the function of inverting the rotation direction transmitted to the driving wheel, which in this case is concurrent to the rotation direction of the crankshaft 2, and they introduce a fixed reduction ratio on the hub.

It is to be meant that the hub shaft 5 could be constituted by the same secondary shaft, provided that one renounces to the above mentioned reduction ratio on the hub and providing to invert the rotation direction of the crankshaft 2.

In the light of what above, in each case the secondary shaft is directly or indirectly connected, from the mechanical point of view, to the driving wheel thereto the gearbox refers. The crankshaft 2 and the primary shaft 3 are substantially parallel and they are connected by transmission elements which allow the motion transmission according to different speed ratios. Such transmission elements include a first group of toothed pulleys assembled on the crankshaft 2, a second group of toothed pulleys assembled at the primary shaft 3, and a pair of transmission belts extending from the first to the second group of pulleys.

Under transmission belt any flexible annular element is meant apt to transmit the motion between two pulleys offset therebetween, in particular with axes parallel therebetween. The transmission belts then include any kind of belts or chains, the pulleys in case could be toothed to implement a synchronous connection.

In the present embodiment, as well as in the subsequent ones, the transmission belts advantageously are synchronous transmission belts; under synchronous belt a belt, usually a toothed belt or a roller chain, is meant which transmits the motion from a wheel or toothed pulley to another wheel or toothed pulley with a transmission ratio which is determined by the ratio between the diameters of the wheels, without it is subjected to clutch or sliding losses.

However, generally, the herein described transmission is of the synchronous or almost synchronous type, and it uses a pair of pulleys connected kinematically by a belt, preferably a toothed belt on toothed pulleys or a high performance belt, for example of the Stretch Fit® type or the like.

It is to be meant that what described hereinafter can be wholly or partially applied even to an equivalent synchronous transmission of other type, for example a pinion—chain—toothed wheel transmission.

The absence of sliding portions and/or portions dragged by clutch, typical instead of the gearboxes of CVT (Continuously variable transmission) type, even known as continuous gearboxes or continuous variators, makes the herein described gearbox of synchronous type. Therefore, in the present embodiment as well as in the subsequent ones, the above-mentioned pulleys are toothed pulleys, connected by toothed belts, preferably of the type made of rubber. On the crankshaft 2 a main clutch 8 is assembled which, in the present example, is of centrifugal type, well known in the art. In this example, this kind of clutch allows the motion transmission from the crankshaft 2 to the cascaded transmission elements, and it engages automatically at a rotation regime comprised in a prefixed range, for example between 1000 and 2000 revolutions per minute. At a lower rotation regime, the clutch 8 is not engaged and the engine is idle, whereas the driving wheel is not stressed.

However, it is meant that, in particular applications, this type of clutch can be replaced by a manual coupling clutch which is perfectly equivalent, or by a clutch actuated by a servo-mechanism.

On the crankshaft 2 a first pulley 9 and a second pulley 10 are keyed in cascade to said clutch 8. They are respectively connected, by means of a first synchronous belt 11, to a third pulley 12 and, by means of a second synchronous belt 13, to a fourth pulley 14.

At the front of the crankshaft 2, there is a first synchronizer 16 for synchronizing the second belt 13, that is the connection between second and fourth pulley 10, 14, whereas at the front of the primary shaft 3 there is a second synchronizer 17 which synchronizes the toothed wheels keyed on such primary shaft 3.

In fact, a first and a second toothed wheel are keyed on the primary shaft 3 which are engaged, respectively, with a third toothed wheel and with a fourth toothed wheel, both keyed on the secondary shaft. The third toothed wheel 20, in this embodiment, is assembled on a second free wheel.

When the clutch 8 is activated so that it transmits the motion through the crankshaft 2, the two synchronizers 16, 17 are not active and the first speed is transmitted through the first and the third pulley 9, 12 and the first belt 11.

At a particular moment, which can be decided by the driver or autonomously set by the system, according to a well precise implemented logic, the system is requested to pass from the first to the second speed and, even in this case, the transmission uses the first synchronous belt 11.

In this case, however, the second actuated synchronizer 17, arranged on the primary shaft, is activated, and so it intervenes by synchronizing a pair of toothed wheels assigned to the transmission of the second and of the fourth speed.

At a particular moment, which can be decided by the driver or autonomously set by the system, according to a well precise implemented logic, the system is requested to pass from the second to the third speed and, in this case, the transmission has to use the second synchronous belt 13.

The first synchronizer 16 placed onto the crankshaft 2 is activated, by implementing the synchronization of the second pulley 10 of the third and of fourth speed. In the latter case, the second synchronous belt 13, now placed in motion, transmits the motion to the primary shaft of the gearbox. As the two belts 11, 13 are moving contemporarily, the first shaft 3 would have two different speeds set by the transmission, however this is avoided by the presence of a free wheel which allows to disengage the third pulley 13 related to the first and second speed.

However, in the same moment, on the driven shaft, the second synchronizer 20 on the primary shaft 3 has to be deactivated, so as to cease the synchronization of the ratio of toothed wheels of second and fourth speed. Therefore, the motion reaches the primary shaft through the pair of pulleys related to the third and fourth speed, and the primary shaft rotates with the speed set by the third speed.

It is to be noted that the synchronizer has to be deactivated independently from the rotation speed reached by the respective primary shaft, and this makes that it has to be of actuated type, that is of the type which is actuated or deactivated after an actuation determined by a system decision and not by simply reaching a rotation regime.

As last case the insertion of the fourth speed remains: as to the first synchronizer 16 on the crankshaft nothing changes with respect to the case of the third speed. In fact, the second belt 13 between the second and the fourth pulley 10, 14 continues to be active.

However, for the fourth speed, even the second synchronizer 17 has to intervene which is actuated on the primary shaft 3, by synchronizing again a pair of toothed wheels belonging to the second and fourth speed.

By referring to the first synchronizer 16 (FIG. 2) the structure of the herein described synchronizers, and the operation thereof, is described.

The synchronizer comprises a supporting plate 21 which has a substantially flared shape, to define a space contained therein; then it has a concavity faced in opposite direction with respect to the transmission elements to be actuated.

Therefore, it extends axially between two planes, a more external one there at the plate 21 comprises a wide central opening, and a more internal one having a central hole, thereat it is constrained to transmission elements, in particular to the carter of a gearbox.

It comprises an actuation axis, constituted by a shaft 53, having a proximal actuation end 22 inserted internally in the central hole of the plate 21. The rotating shaft 53 extends from the supporting plate 1 in the remaining portion of the transmission elements which will be now described; the axial translation thereof determines the synchronization of a transmission element.

The synchronizer comprises a bell-like spring 23 which is substantially shaped like a cone, implemented by a metal sheaf wherein through slots are made allowing to deform the spring according to an axial direction.

It has then the shape of a conical disc and the periphery thereof is rested upon the outer edge of the supporting plate 1, so as to cover wholly said central opening thereof; the conical end of the bell-like spring 23 has a central opening with a circular edge thereon a ball bearing 25 is fastened which acts as platform for assembling a cam follower 26, fastened outside the spring 23, the function thereof is to translate axially opposed to the elastic resistance offered by the spring 23, so as to interfere with the actuation end 22 of the shaft 53. The cam follower 26 is substantially shaped like a disc and the cam profile thereof is formed on the disc face directed outwards, defined on a peripheral circumference arc of the cam 26 and formed by a raised rib.

The disc of the cam follower 26 forms a plane perpendicular to the synchronization axis, and the cam profile thereof projects perpendicularly from said plane, in axial direction.

A corresponding cam 29 is associated to the above-mentioned cam follower 26, having a hole wherein an actuation spindle 30 is inserted with a plug connection allowing the rotation of the cam 29 by rotating said spindle 30, the axis thereof coincides with the axis of the actuation shaft 53.

On the contrary, the cam follower 26 has a recess faced towards the actuation spindle 30 which constitutes a seat thereof for the distal end thereof.

The cam 29 comprises a ring apt to couple with said cam follower 26, on the exposed face thereof a second cam profile is formed which projects axially and which is intended to couple with the cam profile of the cam follower 26. On this regard, it will include a raised cam surface, a lowered cam surface and related tilted connections.

In the light of what above, the above-described synchronizers 16, 17 have an actuation of axial type, that is they are actuated by the translation of an element in the direction of the rotation axis of the rotating shaft thereon the synchronization takes place.

Each synchronizer 16, 17 comprises a respective rotating cam actuator having a cam 29 apt to be rotated by an actuation spindle 30 of the cam 29 which determines the translation of a cam follower 26 which in turn interferes with the actuation end 22 of the respective synchronizer.

At the opposite distal end, the actuation spindle 30 comprises a control wheel 36 which is useful to rotate the cam 29 with respect to the cam follower 26, thus determining the translation of the cam 26 and, consequently, of the actuation end 22 and of the shaft 53.

In the present transmission, the first synchronizer 16 has a first control wheel 36 which, as it will appear better hereinafter, is a toothed wheel which is dragged in rotation by an electric motor.

Going back to the operation of the synchronizer, a half-rotation of the cam 29 determines the translation, in one direction or in the other one, of the cam follower 26, of the bearing 25 and of the bell-like spring 23, and then of the actuation end 22.

A first and a second actuation pulley 37, 38, respectively, is provided on the actuation spindle 30 of each synchronizer 16, 17, keyed in particular on the distal end of the spindle projecting outside the synchronizer.

The two actuation pulleys 37, 38 are made synchronous by an actuation belt 39, in particular of filiform type, inserted in the peripheral guides of the actuation pulleys 37, 38.

In this way, the rotation set by the control wheel 36 to the actuation spindle 30 of the first synchronizer 16 will be transmitted even to the actuation spindle of the second synchronizer.

In the light of the above-described operation of the transmission, this synchrony will be so as to determine, in sequence, the activation of the second synchronizer (second speed), followed by the de-activation thereof and by the simultaneous activation of the first synchronizer (third speed), in turn followed by the simultaneous activation of both synchronizers (fourth speed), starting from both de-activated synchronizers (first speed).

Therefore, the first actuating pulley 37, connected to an actuation spindle 30 of the cam 29 which is rotated by the control wheel 26, and the second actuating pulley 38, connected to the other actuation spindle 30 of the second synchronizer 17, are connected by a belt so that the simultaneous rotation thereof is caused by the rotation of said control wheel 36, each speed corresponding to an angular position of said first and second actuating pulleys 37, 38.

This sequence will be controlled by the rotation of the control wheel 36, and in particular a step of said sequence will correspond to each rotation angle of 90°.

In this example, the control wheel 36 is a toothed wheel which is actuated in rotation by means of an electric motor 40 equipped with a toothed shaft 41 engaged in said toothed wheel 36. In particular, this electric motor will be of the type with rotating shaft, which conveniently will be of the screw type.

The screw shaft 41 is included in a casing 42 which guarantees the position thereof, and it is connected by means of a plug connection to the rotor of the electric motor 40, the whole being connected to the transmission carter and electrically fed through a control board. In this example, the electric motor 40, the screw shaft thereof 41 and the toothed control wheel 36 are arranged at the first synchronizer, that is the one arranged at the crankshaft 2 of the transmission 1, whereas the second synchronizer 17 is actuated in cascade through the actuating pulleys, but it is meant that this scheme could be in case overturned without leaving the protective scope of the present invention, the operation remaining substantially specular and unchanged with respect to the herein described example.

It is to be further meant that the electric motor could be selected of the most convenient type for this application. It could be driven by a board which replies either to a pre-set operation logic in a wholly automatic gearbox or to a control given by the vehicle's driver.

By way of example, the electric motor could be of axial type, so as to control in axial translation a control spindle which, in this case, could be a rack.

To the above-described synchronized transmission a person skilled in the art, with the purpose of satisfying additional and contingent needs, could introduce several additional modifications and variants, however all comprised within the protective scope of the present invention, as defined by the enclosed claims.

The invention claimed is:

1. A synchronized transmission used in a motorcycle, wherein a crankshaft actuated by an engine and a driven shaft, connected to a rear wheel, are substantially parallel and kinematically connected therebetween, comprising a first axial actuation synchronizer placed at a front of the crankshaft and a second axial actuation synchronizer arranged at a front of the driven shaft kinematically connected to the rear wheel, each synchronizer comprising a respective rotating cam actuator having a cam apt to be rotated by a respective cam spindle by determining a translation thereof which interferes with an actuation end of the respective synchronizer.

2. The synchronized transmission according to claim 1, further comprising:
   a toothed control wheel, keyed on one of the cam spindles, actuated in rotation by means of an electric motor equipped with a toothed shaft engaged in said toothed control wheel; and
   a first actuating pulley, connected to the one of the cam spindles corresponding to said control wheel, and a second actuating pulley, connected to the other cam spindle, said pulleys being connected by a belt which causes the simultaneous rotation thereof by actuating said control wheel, each of a plurality of speeds corresponding to an angular position of said first and second actuating pulleys.

3. The synchronized transmission according to claim 2, wherein said first and second actuation pulleys are keyed on a distal end of one of the respective cam spindles projecting outside the one of the respective synchronizers.

4. The synchronized transmission according to claim 2, wherein said belt is of filiform type.

5. The synchronized transmission according to claim 2, wherein the rotation of the control wheel is arranged so as to determine, in sequence, the activation of the second synchronizer (second speed), followed by the de-activation thereof and by the simultaneous activation of the first synchronizer (third speed), in turn followed by the simultaneous activation of both synchronizers (fourth speed), starting from both de-activated synchronizers (first speed).

6. The synchronized transmission according to claim 5, wherein said sequence is controlled by the rotation of the control wheel, a step of said sequence corresponding to each rotation angle of 90° thereof.

7. The synchronized transmission according to claim 2, wherein the electric motor has a rotating shaft controlling a screw toothed shaft.

8. The synchronized transmission according to claim 1, wherein each rotating cam actuator has the cam apt to be rotated by an actuation of the respective cam spindle of the cam which determines the translation of a cam follower which in turn interferes with the actuation end of the respective synchronizer in opposition to a spring.

9. The synchronized transmission according to claim 1, wherein a bearing is provided between a cam follower and the actuation end.

10. A motorcycle comprising a propulsion unit arranged in a position below a saddle, inside a chassis extending from a front wheel to the rear driving wheel, comprising, between said propulsion unit and said rear wheel a transmission according to claim 1, received in a container closed, on an exposed side of the motorcycle, by a cover.

* * * * *